May 26, 1970     V. G. STRANG     3,514,567
WELDING EQUIPMENT
Filed July 22, 1968
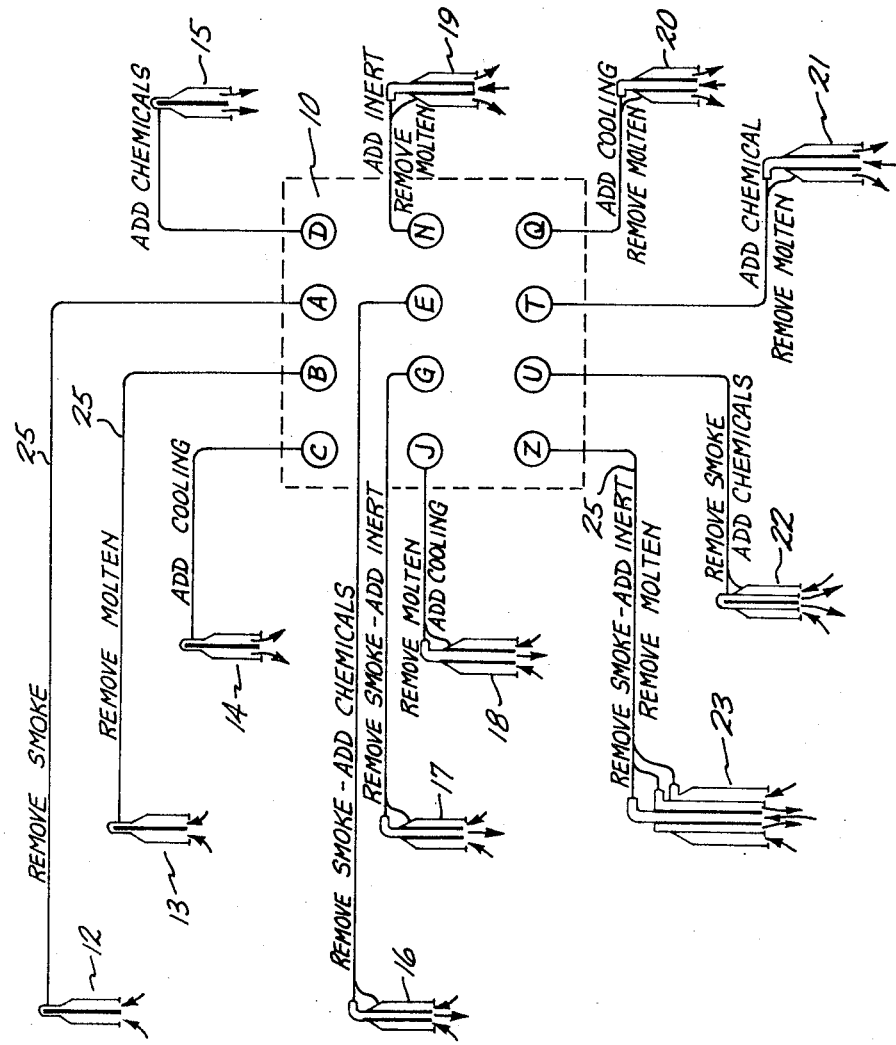
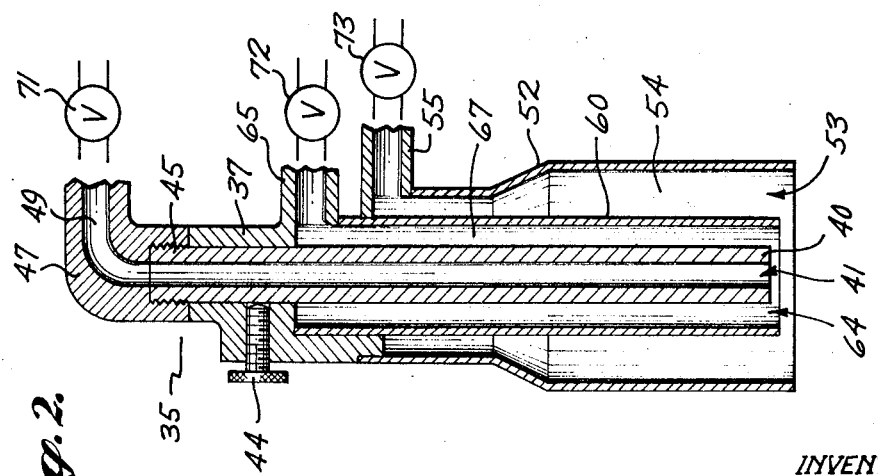
INVENTOR:
VIRGIL G. STRANG
BY
Christensen, Sanborn & Matthews
ATTORNEYS United States Patent Office 3,514,567
Patented May 26, 1970

3,514,567
WELDING EQUIPMENT
Virgil G. Strang, 12307 85th S.,
Seattle, Wash. 98178
Filed July 22, 1968, Ser. No. 746,512
Int. Cl. B23k 9/16, 9/24, 35/38
U.S. Cl. 219—75
4 Claims

ABSTRACT OF THE DISCLOSURE

Various improved welding systems are disclosed for conveniently performing a broad range of welding operations. Associated with the intense heat generation member of the welder, there is provided a hood structure which is connected through suitable conduits to a source of suction for removing the smoke generated by the welding operation from the welding area. In addition, the hooded structure with increased suction can remove the molten material produced by the heat of the welding implement. An improved electrode is disclosed which defines a hollow channel through its length for conducting inert gases or treating chemicals to the welding area at the end of the electrode or for drawing the molten material produced at the welding area up through the electrode. A sleeve may be positioned to surround the electrode to provide many of the function related for either the hood or hollow portion of the electrode. A central welder console is disclosed having a variety of connection outlets selectively providing the necessary electrical, inert gas, or treating chemical supply services, or the molten material or smoke suction connections or any combination theerof to service the individual remotely located welding units through a combination conduit connecting hose.

BACKGROUND OF THE INVENTION

Field of the invention

This invention relates to methods and apparatus for performing various welding functions and particularly to the function involving smoke removal, molten material removal, chemical heat treatment and reduction of weld contamination.

Description of the prior art

For purpose of this application the term "welding" should be broadly construed to include virtually all heat treatment of base materials wherein the base material changes its character somewhat due to the imposition of a generally intense heat source adjacent it. Some of the better known welding processes include cutting of base materials such as metal, plastics, glass and the like by subjecting them to intense heat which causes a portion of the base material to become fluid which is removed. A bending process may include subjection of the base material to intense heat while subjecting the material to certain forces adjacent the heated area until the material begins to flow in the heated area permitting the forces to deform the base material. Two materials may be bonded together by placing them adjacent one another, applying heat with or without additional pressure such that the materials flow into one another or are bonded together by molten filler material which bridges between the two base pieces. Other heat treating processes may include the addition of certain types of chemicals to the surface or edges of base material by directing gaseous flow rich with such treatment chemicals against a heated portion of the base material.

In many of these welding processes there are several problems presented which if eliminated could make the processes easier to perform with better results. Generally as a base material is subjected to the intense heat of the welding implement, smoke is generated which is detrimental to the health of the welder and those in the immediate area. The smoke also causes a reduction in visibility which may present a safety hazard and in most cases causes a delay in the performance of a complete welding operation due to the inability of the operator to see the workpiece adequately to perform the function desired. Vent pipes have been used to ventilate welding areas but they are generally cumbersome to manipulate and often get in the way of the welder and others working in the immediate area.

When the welding implement imposes sufficiently intense heat energy against a base material, molten material is formed in the workpiece which often splatters around and interferes with the cutting operation. If fluid or gas jets are used to blow the molten material out of the way, the molten material may fuse itself to the workpiece surface and thus cause additional cleaning and machining work before the workpiece is in a useful form.

Other welding problems are present because some metals become adversely affected by the contaminating effects of the adjacent atmosphere during a welding operation and the electrical cables leading up to the welding implement often become overheated due to long periods of welding, causing insulation breakdowns and ultimately present a fire hazard and electrical hazard.

Several welding improvements have been made over the years to eliminate or reduce many of the above referred to problems. In the patent to Prendergast et al. No. 2,310,164 an improved electrode holder is disclosed which includes a hood configuration for directing inert gaseous material around the electrode into the welding area to thereby exclude from the welding area the contaminating gases of the atmosphere. It is clear, however, that this electrode holder does not in any way prevent, and actually aggravates, the smoke generation condition around the welding area. In addition, the molten material formed is not removed nor is there any disclosure of utilization of the inert blanket to perform the function of carrying treating chemicals to the welding area.

The patent to Webster 2,432,639 discloses a stinger-type welding implement which includes a provision, within the welding rod holder, of an air cooling system which receives pressurized air and distributes it around the electrical connections and the welding rod to cool these parts of the implement. While this improvement does provide a means and technique for cooling the electrical connections involved, it does not in any way eliminate the smoke problem since it merely blows the smoke away from the implement rather than in any way controlling the generated smoke and flame. Thus the visibility and health problem caused by such smoke is in no way reduced by this type of implement.

The two patents to Brillinger Nos. 2,826,667 and 2,960,591 disclose improvements in soldering guns which provide means for periodically creating a suction adjacent the end of the heating element to thereby remove through a suction tube the molten solder from the electrical connections which have been heated by the heating element. The design of this equipment is limited to the relatively low temperatures involved in soldering and the capicity for removal of the solder is limited to small quantities of such molten material. It is therefore seen that such equipment could not be readily converted to provide an adequate means for continuously removing the molten material formed by a welding implement.

SUMMARY OF THE INVENTION AND OBJECTS

From the foregoing discussion of prior art techniques for various welding operations, it is clear that there is a need for a simply constructed, easily used system for heat treating base materials without yielding the related disadvantages. It is therefore the principal object of this invention to provide a generally improved welding system for heat treating base materials.

It is another object of the instant invention to provide a generally improved welding system which provides means for removing the smoke generated by the welding operation to thereby increase the visibility of the operator and to reduce the health hazards caused by such smoke generation.

A still further object of the instant invention is to provide a welding system which includes a means for continuously removing the molten material developed by the welding operation.

A still further object of the instant invention is to provide a welding system which includes a combination of structures for providing an inert atmosphere surrounding the welding area, while at the same time removing the generated smoke produced by the welding operation.

An additional object of the instant invention is to provide a generally improved electrode structure which includes means for adding chemicals to the welding area.

A still further additional object of the instant invention is to provide a generally improved welding electrode which provides means for removing molten material from the welding area.

A still further object of the instant invention is to provide a centralized welding console for providing a variety of services through combination conducts to the individual welders with such services including smoke removal suction, molten material removing suction, inert gas supply, treating chemical supply, and electrical current supply.

A related object of the instant invention is to provide a generally improved electrode holder which includes structural means for directing various services to the area adjacent the electrode, such as for smoke removal, molten material removal, inert gas addition, treating chemical addition, and combinations thereof.

In accordance with the present invention a number of various structural means are provided to perform generally improved welding operations. The flexibility of the systems disclosed is such that some features are useful with torch-type heat sources, welding rod heat sources, and permanent electrode heat sources. For smoke removal a hood structure is provided which surrounds or is positioned adjacent the heat generation member and is connected to a suitable continuous suction generation means so that the smoke generated through the operation of the heat source adjacent the base metal will be conveyed through the hood structure and therefore away from the weld area to provide an uncontaminated atmosphere and clear visibility adjacent the weld area.

If base metal contamination by the adjacent atmosphere is a problem, conventional helium, argon or other inert gases can be provided through the electrode holder and conveyed by a suitable structure provided in the holder to the weld area. The provision of the inert gas blanket around the weld area can be made with or without the provision of the smoke removal structure.

In addition to torch and consumable welding rod electrodes, a permanent electrode may be used having a structure which defines a hollow conduit through its length. This conduit is used to convey molten material from the weld area to a suction source connected to the electrode. In addition, this conduit may provide a path for the inert gases from their supply through the electrode down to the weld area. Further, chemical additives can be directed toward the weld area through the conduit formed by the hollow portion of the electrode. If the electrode is held in a sealed condition by means of a seal formed by a hood structure encircling the electrode and making an airtight seal against the workpiece, it is possible to circulate a noncontaminating atmosphere through the electrode and out through the hood portion of the electrode holder without breaking the seal and thereby preventing the contaminating atmosphere outside of the hood from affecting the weld area. A sleeve surrounding the electrode may be provided to perform the functions of either the hollow electrode or the hood, depending on whether the hollow electrode is provided or the hood structure is provided.

A central welding console may be positioned in a convenient spot so that the individual supply hoses and cables can be plugged into the console for supplying individual welders at remote locations. The console may include various connectors to provide the various services through the connecting hoses to the welding implements.

These and other features and advantages of the invention will become more clearly apparent from the following detailed description thereof, which is to be fed with reference to the accompanying drawings.

BRIEF DESCRIPTION OF THE DRAWINGS

In the drawings:

FIG. 1 is a schematic drawing illustrating a composite welding console providing a number of various types of services to a series of remotely positioned welding implements, all in accordance with the present invention; and FIG. 2 is a side elevation, partly in cross-section, of one form of an electrode holder embodying features of the instant invention.

DESCRIPTION OF THE PREFERRED EMBODIMENT

Because the general field of heat treatment and welding includes a number of different operations with different types of base metals and different types of heat-generating implements, it is not possible to describe the practice of the features of the instant invention with relation to each and everyone of the various forms of welding or heat treating with which one or more of these features could be advantageously used. For this reason it is believed that those skilled in the art will become adequately appraised of the desirable features of the instant invention by the following description of some of its features in association with some of the better known and more common welding operations.

With general reference to FIG. 1, it is noted that a centrally located welding console 10, shown in dashed lines, provides a series of connector points, identified A to Z, providing a variety of suction, supply and electrical services for the hypothetical array of individual electrode holders 12–23 through conduits 25.

With reference to FIG. 2, a multiple purpose electrode holded 35 is illustrated. The specific connection between the conduit 25 and the valves V is not shown since the features of such a valve control, handholder and conduit connector are not part of the instant invention and could be produced by those skilled in the art following the prior art teachings such as related in the previously mentioned Prendergast et al. patent for producing such a holder. In keeping with the teachings of this patent, the body portion 37 of electrode holder 35 would be made of electrically conductive material in contact with the electrical portion of the composite conduit 25. The exact structure of the conduit 25 is also not considered part of the instant invention since a suitable conduit is disclosed in the Prendergast et al. patent and may include means for providing electrical connection along with the gas and other material conveying conduits. For economy, conventional electric conductor welding conduits could be used and supplemented by means of a series of hoses wrapped around and entwined with the electrical conduit with the composite conduit taped periodically to provide a generally unitary conduit structure easily transportable by the welder.

As shown, the electrode 40 is formed to define a hollow central chnanel 41 which provides a path for gas and other material from one end of the electrode to the other.

Electrode 40 is inserted into the body portion 37 of the electrode holder 35 and held in position by set screw 44. The upper end of the electrode is connected, through a screw thread or similar fastening system 45, to conduit connector 47 having defined therein a continuation channel 49 in communication with channel 41 at the end of electrode 40.

The lower portion of holder 35 is surrounded by hood element 52 which is closed at its upper end and open at the lower end defining a general circular opening 53. Conduit connector 55 opens into chamber 54 formed by hood member 52 and is connected by suitable means (not shown) to the supply conduit 25. If desired, and as shown, an additional surrounding structure in the form of sleeve 60 may be provided for encircling electrode 40 but spaced within hood structure 52 to define another opening 64 at its lower end for conducting the gaseous materials to or from conduit connector 65 positioned at its upper end. Chamber 67 formed between the walls of sleeve 60 and the exterior of electrode 40 is in communication between lower opening 64 and conduit connector 65.

In use, electrode holder 35, shown in FIG. 2, has inserted within it a permanent type electrode 40 made of tungsten or carbon. If desired a ceramic-like coating can be provided on the interior surface surrounding the channel 41. When the valve 71 is open and conduit 25 is connected to connector Z of welder console 10, sufficient suction is provided in the channels 49 and 41 to suck the molten material formed by the heat generated in electrode 40 as electric current passes from console 10 through conduit 25 and body 37.

With valve 72 open and conduit 25 connected to outlet Z, an inert gas can be provided through sleeve 60 down through chamber 67 and out opening 64 surrounding the weld area to keep any contaminating atmospheric material from affecting the weld area immediately adjacent the end of the electrode 40. If in addition, valve 73 is open and conduit 25 is connected to outlet Z of the console 10, smoke can be removed through the suction provided from the suction hose portion of conduit 25 making a connection with the conduit connector 55 of the hood 52. Any smoke that is generated by the heating of the base metal is then sucked up through chamber 54 and conveyed along the conduit 25 into the outlet Z of console 10.

Many other variations of operation for the holder 35 can be provided using different connections with the console 10 or even other connections not specifically described herein. For example, the hollow electrode 40 can be connected through a suitable conduit 25 such that treating chemicals, for example carbon dioxide, could be directed toward the welding area through the hollow electrode 40 as it is being heated by the electrode 40. For extended life of the electrode 40 a cooling gas or liquid could be conveyed through the interior channel 41 of electrode 40, or an inert gas could be directed through the hollow channel 41 of the electrode 40. Some or all of these variations could be provided while at the same time providing other connections through sleeve conduit connector 65 such that the chamber 67 of sleeve 60 is used in a manner similar to the hood 52. Sleeve 60 can be used for removing smoke, adding chemicals, providing circulation cooling, or removing molten material. Added variation can be provided by utilizing outlet connector 55 such that the molten material is sucked up through the hood 52 out through the conduit outlet 55. Additional, treating chemicals can be added through the hood conduit connector 55 and circulating air can be passed through connector 55 down through chamber 54 and out opening 53.

If a simple heat treating operation is to be performed utilizing electrode holder 35, it is possible that the lower edge of the hood 52 could be held in a sealing relationship with the base metal by means of a suction drawn through the conduit outlet 55. At the same time a circulating gas could be provided through conduit connector 65 of sleeve 60 and drawn back out by a suction through the interior channel 41 of electrode 40 while the area covered by the hood 52 is given a heat treatment, but not subjected to any of the contamination effects of the outside atmosphere.

Table I provides a listing of some of the numerous variations of use for welder console 10.

TABLE I.—VARIATIONS UTILIZING WELDER'S CONSOLE

| Mode | Hood | Electrode | | Sleeve |
|---|---|---|---|---|
| | | Solid | Hollow | |
| A | Remove smoke | Used | | |
| B | Remove molten | do | | |
| C | Add cooling | do | | |
| D | Add chemicals | do | | |
| E | Remove smoke | | Add chemicals | |
| F | do | | Add cooling | |
| G | do | | Add inert | |
| H | do | | Remove molten | |
| I | Remove molten | | Add chemicals | |
| J | do | | Add cooling | |
| K | do | | Add inert | |
| L | Add inert | | Add chemicals | |
| M | do | | Add cooling | |
| N | do | | Remove molten | |
| O | Add cooling | | Add chemicals | |
| P | do | | Add inert | |
| Q | do | | Remove molten | |
| R | Add chemicals | | Add cooling | |
| S | do | | Add inert | |
| T | do | | Remove molten | |
| U | Remove smoke | Used | | Add chemicals. |
| V | do | do | | Add cooling. |
| W | None | do | | Remove smoke. |
| X | do | | Remove molten | Do. |
| Y | do | | Add inert | Do. |
| Z | Remove smoke | | Remove molten | Add inert. |

As shown in Table I and illustrated in FIG. 1, mode A is practiced utilizing connector A of console 10. Electrode holder 12 is of the solid electrode type with a simple hood surrounding or positioned adjacent the electrode. Conduit 25 provides, in addition to the electrical connection, a passage for air suction between holder 12 and console connector A to remove the smoke from the area adjacent the electrode holder 12.

By utilizing a similar solid electrode holder 13 and a similar conduit 25 but making a connection through connector B, mode B can be practiced wherein the molten material, produced by the heated electrode of holder 13, is removed from the weld area and sucked through the conduit 25. In view of the possibility of the molten material sticking and therefore building up on the suction portion of conduit 25 a pulsating conduit could be used or a type of sonic vibration might be employed to maintain the molten material in a form that will convey it from the holder 13 to a collector means positioned within the welding console 10.

Electrode holders 12 through 15 are schematically illustrated in FIG. 1, as having a single hood surrounding a solid electrode. Electrode holders 16 through 21 are illustrated as having hollow electrodes, such as electrode 40 shown in FIG 2. and a single hood such as hood 52 illustrated in FIG. 2. Electrode holder 22 is schematically illustrated as including a solid electrode with an encircling sleeve and exterior hood. Holder 23 is similar to electrode holder 35 shown in greater detail in FIG. 2.

While the foregoing discussion is principally directed to the use of electrical heat sources as the means for generating the heat-treating phenomena, it is also possible that gaseous torches may be used in combination with a suction source and an external hood for removing the molten material, removing the smoke, or both. Other suitable heat sources of high intensity may also be employed. It should be noted that the conveyance of gas through conduit 25 also assists in cooling the electrode wire connections in conduit 25 as well as in cooling the console 10.

Thus it is seen that a centrally located console may provide a number of different services to remotely located welding implements. Connector C supplies a coolant to electrode holder 14. Connector D adds a chemical to the weld area of holder 15 while connector E not only adds a chemical through the hollow electrode of holder 16, but also removes the smoke generated by holder 16. Other connectors supply the holder with inert gas, electrical current, coolant and chemicals while providing sufficient suction to remove smoke or molten material from the weld area. The use of these services by themselves or in combination yields a greatly improved series of welding operations.

It should also be noted that a consumable welding rod can be used with a hood or sleeve structure operating in modes A to D and U to W as a substitute for the solid electrode. Other variations in the electrode holder are possible to provide rotation of the holder and electrode. Electrode rotation about its central axis could be used in an arc-meltdown furnace wherein the molten material can be stirred by the rotation of the electrode. The hollow electrode could be used in such a furnace to draw off the molten material so that it could be poured into casting with minimum heat loss. The use of a hollow tungsten electrode in such a furnace would also eliminate the uncontrolled carbon addition caused by the flaking of carbon electrodes. The suction removal of gases in the heated zone adjacent to the electrode could produce new economy in the use of inert gases since these gases could be filtered out and reclaimed at the console for later use. Other advantages and modifications in welding equipment become possible once the various features disclosed herein become fully understood by those skilled in this field.

What is claimed is:

1. A welding apparatus comprising in combination
   (a) an electrode having a hollow channel,
   (b) a sleeve concentrically located at a spaced relationship about said hollow electrode forming a ring-shaped chamber.
   (c) a hood structure concentrically located at a spaced relationship about said sleeve forming a ring-shaped hood chamber,
   (d) conduit connecting means individually connecting said hollow electrode channel and said sleeve chamber and said hood chamber,
   (e) associated console means, for providing supply and vacuum suction, linked with said conduit connecting means for providing a continuous first high vacuum suction through said electrode channel for removing molten material and for providing a continuous second vacuum suction through said hood chamber for removing smoke and gases, and for providing a supply of gas or the like through said sleeve chamber during welding operation of said apparatus.

2. A welding apparatus as claimed in claim 1 wherein said hollow channel of said electrode is coated with a ceramic material.

3. A welding apparatus comprising in combination
   (a) an electrode having a hollow channel,
   (b) a sleeve concentrically located at a spaced relationship about said hollow electrode forming a ring-shaped chamber,
   (c) a hood structure concentrically located at a spaced relationship about said sleeve forming a ring-shaped hood chamber,
   (d) conduit connecting means individually connecting said hollow electrode channel and said sleeve chamber and said hood chamber,
   (e) associated console means, for providing supply and vacuum suction, linked with said conduit connecting means for providing a first supply line of chemicals through said electrode channel and, for providing a continuous vacuum suction through said hood chamber for removing smoke and gasses and, for providing a second supply line for gas or the like through said sleeve chamber during welding operation of said apparatus.

4. A welding apparatus as claimed in claim 3 wherein said hollow channel of said electrode is coated with a ceramic material.

References Cited

UNITED STATES PATENTS

| 1,749,765 | 3/1930 | Hendrickson | 219—74 |
| 2,489,002 | 11/1949 | Babbitt | 219—73 |
| 2,768,278 | 10/1956 | Gaines | 219—74 |
| 2,935,312 | 5/1960 | Kilpatrick et al. | 219—130 |
| 2,963,570 | 12/1960 | Rieppel | 219—74 |
| 3,025,387 | 3/1962 | Kinney | 219—75 |
| 3,108,179 | 10/1963 | Ulli | 219—130 |
| 3,137,783 | 6/1964 | Addie | 219—74 |
| 3,192,079 | 6/1965 | Takagi et al. | 219—73 |

WILLIAM DEXTER BROOKS, Primary Examiner

U.S. Cl. X.R.

219—130